US009509717B2

(12) United States Patent
Stute (10) Patent No.: US 9,509,717 B2
(45) Date of Patent: Nov. 29, 2016

(54) END POINT SECURED NETWORK (71) Applicant: Masergy Communications, Inc., Plano, TX (US)

(72) Inventor: Michael Roy Stute, Crystal River, FL (US)

(73) Assignee: Masergy Communications, Inc., Plano, TX (US)

( * ) Notice: Subject to any disclaimer, the term of this patent is extended or adjusted under 35 U.S.C. 154(b) by 0 days.

(21) Appl. No.: 14/459,409

(22) Filed: Aug. 14, 2014

(65) Prior Publication Data

US 2016/0050189 A1  Feb. 18, 2016

(51) Int. Cl.
*H04L 29/06* (2006.01)

(52) U.S. Cl.
CPC ........... *H04L 63/162* (2013.01); *H04L 63/045* (2013.01); *H04L 63/0442* (2013.01); *H04L 63/0876* (2013.01)

(58) Field of Classification Search
CPC ............. H04L 63/162; H04L 63/0442; H04L 63/0876
See application file for complete search history.

(56) References Cited

U.S. PATENT DOCUMENTS

| | | | |
|---|---|---|---|
| 5,781,550 A | 7/1998 | Templin et al. | |
| 8,087,064 B1* | 12/2011 | Baum | H04L 12/4633 705/73 |
| 8,107,396 B1* | 1/2012 | Sharma | H04L 61/103 370/254 |
| 2003/0061615 A1 | 3/2003 | Van Der Meulen | |
| 2006/0037077 A1 | 2/2006 | Gadde et al. | |
| 2006/0268856 A1* | 11/2006 | Voit | H04L 63/0838 370/389 |
| 2007/0192644 A1* | 8/2007 | Kimura | G06F 1/3203 713/320 |
| 2007/0248225 A1 | 10/2007 | Fluhrer | |
| 2008/0075073 A1* | 3/2008 | Swartz | H04L 63/162 370/389 |
| 2008/0126559 A1* | 5/2008 | Elzur | H04L 63/0464 709/232 |
| 2008/0162922 A1* | 7/2008 | Swartz | H04L 63/162 713/150 |
| 2009/0034738 A1* | 2/2009 | Starrett | H04L 63/162 380/278 |
| 2009/0158388 A1* | 6/2009 | Sridhar | H04L 41/0604 726/2 |

(Continued)

OTHER PUBLICATIONS

D. Harkins et al. "RFC 2409: The Internet Key Exchange (IKE)" ©1998 The Internet Society (41 pages) https://tools.ietf.org/pdf/rfc2409.pdf.*

(Continued)

*Primary Examiner* — Joseph P Hirl
*Assistant Examiner* — Thomas Gyorfi
(74) *Attorney, Agent, or Firm* — McGuireWoods, LLP (57) ABSTRACT

The disclosed embodiments include a method for receiving data packets at a host system. In one embodiment, the method includes the steps of: intercepting a data packet, at a data link layer, that is being sent to an input/output (I/O) port of the host system using a hardware device that is located between a hardware network interface and the input/output port of the host system; reading, using the hardware device, at least one parameter from the data packet; determining, by the hardware device using instructions written in memory of the hardware device, whether the at least one parameter meets an authentication criteria, wherein the host system is unable to write to the memory of the hardware device; and in response to determining that the at least one parameter meets an authentication criteria, forwarding, by the hardware device, the data packet to the input/output port of the host system.

19 Claims, 7 Drawing Sheets

(56) References Cited

U.S. PATENT DOCUMENTS

| | | | |
|---|---|---|---|
| 2009/0183252 A1* | 7/2009 | Nomi | H04L 63/08 726/13 |
| 2009/0319773 A1 | 12/2009 | Frenkel et al. | |
| 2010/0153550 A1* | 6/2010 | Diab | G06F 21/85 709/225 |
| 2012/0036364 A1* | 2/2012 | Yoneda | H04L 9/30 713/175 |
| 2012/0093508 A1* | 4/2012 | Baykal | H04L 12/2881 398/58 |
| 2012/0311573 A1 | 12/2012 | Govindaraju et al. | |
| 2013/0117852 A1 | 5/2013 | Stute | |
| 2013/0142335 A1* | 6/2013 | Senese | H04W 12/08 380/270 |
| 2013/0205047 A1 | 8/2013 | Miller et al. | |
| 2013/0283045 A1* | 10/2013 | Li | H04L 63/162 713/160 |
| 2014/0226820 A1* | 8/2014 | Chopra | H04L 63/0485 380/277 |

OTHER PUBLICATIONS

Falko Dressler. "Chapter 10: Security Protocols of the Data Link Layer" article published Dec. 15, 2006 (23 pages) http://www.ccs-labs.org/~dressler/teaching/netzwerksicherheit-ws0607/10_LinkLayerSecurity.pdf.*

IEEE Standard for Local and metropolitan area networks—Media Access Control (MAC Security): Amendment 1: Galois Counter Mode—Advanced Encryption Standard—256 (GCM-AES-256) Cipher Suite Published Oct. 14, 2011 (52 pages).*

International Search Report and Written Opinion date mailed Nov. 4, 2015; International PCT Application No. PCT/US2015/045294.

* cited by examiner

END POINT SECURED NETWORK

BACKGROUND

Communications between various computers can be partitioned into different abstraction layers. For example, according to the open systems interconnection (OSI) model, there are seven abstraction layers: the physical layer, the data link layer (also known as the hardware link layer), the network layer, the transport layer, the session layer, the presentation layer, and the application layer.

Conventionally, the security of a network is established at the application layer or the presentation layer. For example, some operating systems include software based firewalls to protect against Internet threats. However, a user or an application with access to the operating system can compromise the operation of the operating system and consequently disable any software firewalls, leaving the computer system vulnerable to external threats.

SUMMARY

The disclosed embodiments include a method for receiving data packets at a host system. In one embodiment, the method includes the steps of: intercepting a data packet, at a data link layer, that is being sent to an input/output (I/O) port of the host system using a hardware device that is located between a hardware network interface and the input/output port of the host system; reading, using the hardware device, at least one parameter from the data packet; determining, by the hardware device using instructions written in memory of the hardware device, whether the at least one parameter meets an authentication criteria, wherein the host system is unable to write to the memory of the hardware device; and in response to determining that the at least one parameter meets an authentication criteria, forwarding, by the hardware device, the data packet to the input/output port of the host system.

The disclosed embodiments also include a method for sending data packets from a host system. In one embodiment, the method includes the steps of: intercepting a data packet, at a data link layer, that is being sent from an input/output (I/O) port of the host system using a hardware device located between a hardware network interface and the input/output port of the host system; reading, using the hardware device, at least one parameter from the data packet; determining, by the hardware device using instructions written in memory of the hardware device, whether the at least one parameter meets an authentication criteria, wherein the host system is unable to write to the memory of the hardware device; and in response to determining that the at least one parameter meets an authentication criteria, forwarding the data packet to a network.

In addition, the disclosed embodiments include an apparatus comprising: a communication interface for communicating with a host system; memory configured to store instructions; a processor configured to execute the instructions stored in the memory to: intercept a data packet at the data link layer that is being sent to an input/output (I/O) port of the host system; read at least one parameter from the data packet; determine, using data and instructions written in the memory, whether the at least one parameter meets an authentication criteria, wherein the host system is unable to write to the memory of the apparatus; and in response to a determination that the at least one parameter meets an authentication criteria, forwarding the data packet to the input/output port of the host system.

The above summary merely provides examples of particular embodiments disclosed herein and are not intended to be exhaustive or limit the scope of the claims. Other embodiments and advantages of the disclosed embodiments will be further described in the detailed description.

BRIEF DESCRIPTION OF THE DRAWINGS

Illustrative embodiments of the present invention are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The embodiments discussed herein pertain to system(s), method(s), or computer readable medium(s) for intercepting a data packet at the data link layer sent to an input/output (I/O) port of a host system using a hardware device located between a hardware network interface and the I/O port of the host system, reading one or more parameters from the data packet, and upon determining that the one or more parameters meets an authentication criteria, forwarding the data packet to the input/output port.

According to the OSI model, the physical layer defines the physical and electrical properties of a data connection such as the physical transmission medium, voltages cable specifications, and signal timing. The data link layer sits on top of the physical layer. In other words, the data link layer provides an additional level of abstraction over the physical layer. The data link layer is the protocol that allows for the transfer of data between nodes in a wide area network (WAN) or a local area network (LAN) segment. The data link layer provides a reliable link between two connected nodes by controlling access to data, permission to transmit data, error checking, and packet synchronization. Data link layer protocols include Ethernet, Token ring, IEEE 802.11 wireless LAN, fiber distributed data interface, or any other suitable protocol. The network layer is responsible for transferring variable length data sequences (datagrams) between nodes in the same network. The transport layer transfers datagrams from a source to a destination through one or more networks. The session layer manages connections between computers by controlling connections between a local and remote application. The presentation layer is responsible for communication between application layer entities by, for example, mapping and translating syntax and semantics of different applications. The application layer manages the interaction between the user and software applications.

Figure 1:
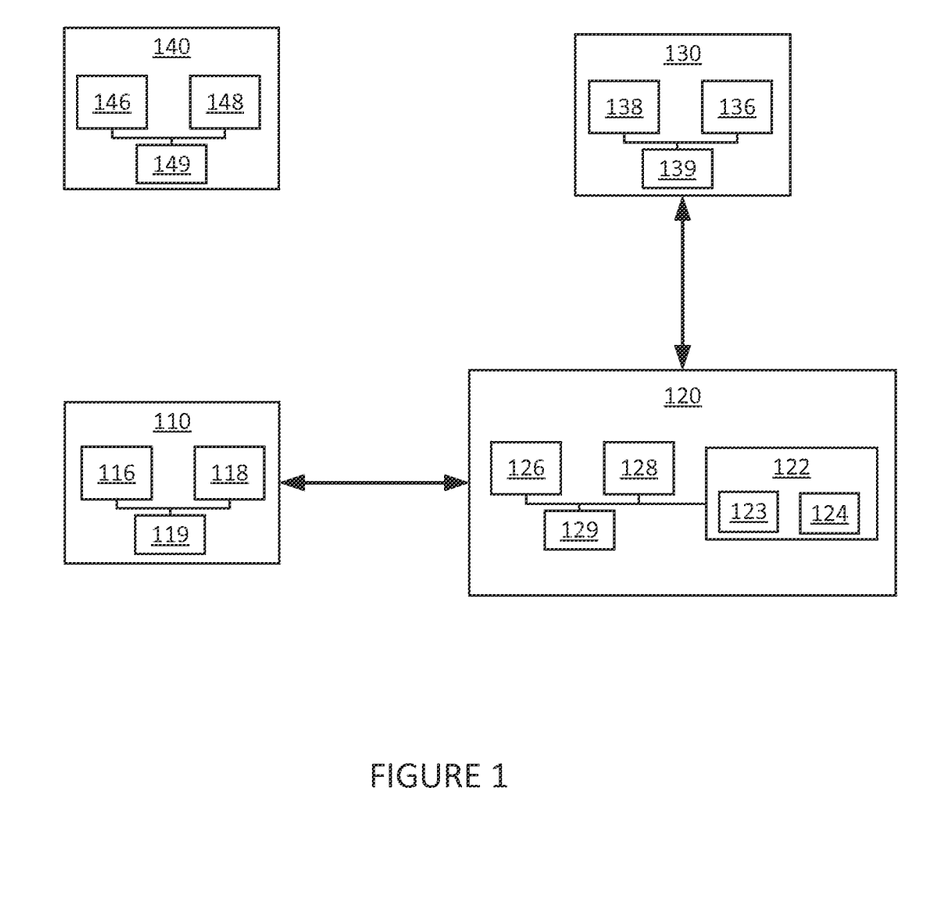
FIG. 1 illustrates a first network architecture in which network security is implemented at the data link layer in accordance with one embodiment of the disclosed inventions.

With reference to the drawings, FIG. 1 illustrates a first network architecture in which network security is implemented at the data link layer in accordance with one embodiment of the disclosed inventions. The network architecture includes one or more systems 110, 120, 130, and 140. In the depicted embodiment, system 120 is connected to a hardware device 122 to authenticate and process data from system 110 and system 130. Systems 110, 120, and 130 are part of a single network or part of multiple interconnected networks. System 140 is an external system that may be, but is not necessarily connected to the network(s) connected to systems 110, 120, and 130. Each of the systems 110, 120, 130, and 140 include a processing device (116, 126, 136, and 146 respectively), memory (118, 128, 138, and 148 respectively), and an input/output interface (119, 129, 139, and 149 respectively), all of which is interconnected via a system bus.

Memory 118, 128, 138, and 148 includes Dynamic Random Access Memory (DRAM), Static RAM (SRAM), flash memory, cache memory, or any other suitable type of memory. In an embodiment, memory and processing device (s) are distributed across several different computers that collectively comprise a system.

The processing device 116, 126, 136, and 146 performs computations and controls functions of a system and comprises a suitable central processing unit (CPU). The processing device may comprise a single integrated circuit, such as a microprocessing device, or any suitable number of integrated circuit devices and/or circuit boards working in cooperation to accomplish the functions of a processing device. The processing device executes computer instructions stored within memory.

In an embodiment, each system 110, 120, 130, and 140 may include a database. The database is adapted for data storage, search, and retrieval. Non-limiting examples of databases include Informix, Oracle, DB2, and Sybase.

The hardware device 122 includes a processing device 123 and a memory 124. In an embodiment, the memory 124 is preprogrammed read-only memory (ROM). Alternatively, in another embodiment, the memory 124 is programmable using an external device, such as, but not limited to, the external computer system 140. Specifically, the host system 120 on which the hardware device 122 is coupled to cannot make any modifications to the instructions in the memory 124 of the hardware device 122. External computer system 140 may be a specially configured loading device or a general purpose computer. In an embodiment, the hardware device 122 is programmed by connecting it to the external computer system 140 through an interface which has a switch to signal whether instructions can be written to the memory of the hardware device 122. For example, the hardware device 122 may be connected to the external computer system 140 through a peripheral component interconnect extended (PCI-X) interface with the PCI-X jumper set to read and write. However, when the hardware device 122 is connected to the system 120, the PCI-X jumper is set to read-only so that system 120 cannot make any modifications to the memory of hardware device 122. In another embodiment, the hardware device 122 is connected to the system 120 via a USB port or any other tethered concept.

In certain embodiments, when the hardware device 122 is connected to the system 140, the system 140 automatically detects the hardware device 122 and loads corresponding instructions into the hardware device 122. The instructions may be copied over from the system 140's memory, database, or an external memory device such as a USB device plugged into system 140.

Alternatively, in some embodiments, when the hardware device 122 is connected to the system 140, the system 140 detects the version of the instructions already present in the hardware device 122. If the system 140 determines that the version is outdated, the system 140 updates the hardware device 122 with the latest version of the instructions.

In one embodiment, when connected to the host system 120, the hardware device 122 is located at the data link layer between the hardware network interface and the input/output (I/O) port of the host system 120. Data packets received by the hardware device 122 are examined and processed by the hardware device 122. The hardware device 122 performs selection, filtering, or modification of data packets based on one or more parameters within the packet, including source address, destination address, header checksum, protocol, time to live (TTL), fragmentation information, length, quality of service, Internet header length, version, or any other suitable parameter found in the data packet. For example, in one embodiment, the hardware device 122 authenticates each packet sent to the host system 120 based on one or more parameters and only moves the packet to an input/output (I/O) port of the host system 120 upon valid authentication.

Additionally, in certain embodiments, the hardware device 122 is configured to authenticate each packet sent from the host system 120 to any external system such as systems 110 and 130 based on one or more parameters within the packet and only releases the packet to the network upon valid authentication. This prevents data packets from being maliciously sent out from the host system 120 in circumstances where applications or the operating system of the host system 120 are compromised by, for example, a computer virus or a hacker.

As an example, in one embodiment, the hardware device 122 performs selection, filtering, or modification of the data packets using a packet selection language such as Berkeley Packet Filter (BPF) or any other suitable packet selection language. The packet selection language is loaded into the memory of the hardware device 122 prior to connecting the hardware device 122 to the host system 120.

In some embodiments, the hardware device 122 can be part of the host system 120. Alternatively, in other embodiments, the hardware device 122 is externally coupled to the host system 120. For instance, in one embodiment, the host system 120 is a computer device and the hardware device 122 is part of a network interface controller (NIC) connected to the host system 120. In another embodiment, the hardware device 122 is part of a network switch or any other network device located external to the I/O ports of the host system 120.

In certain embodiments, the hardware device 122 includes an intrusion detection system (IDS) or an intrusion prevention system (IPS) that includes a behavioral collector (log d) and a signature engine such as Suricata. The hardware device 122 monitors inbound and outbound data packets and detects suspicious network activity. The hardware device 122 correlates information from multiple data packets to perform data fragment reassembly and detects the suspicious network activity. Therefore, in this embodiment, the hardware device 122 includes a buffer to store and correlate multiple data packets before they are released to the host. In an alternative embodiment, the hardware device 122 can be configured to route packets to an external system that performs the above described buffering function.

Figure 2:
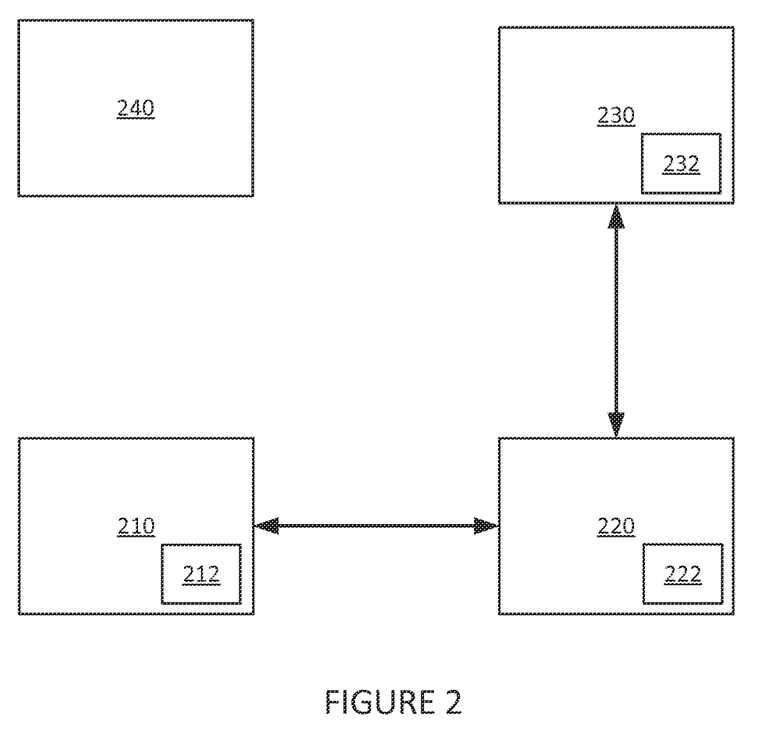
FIG. 2 illustrates a second network architecture in which network security is implemented at the data link layer in accordance with a second embodiment of the disclosed inventions.

FIG. 2 illustrates a second network architecture in which network security is implemented at the data link layer in accordance with a second embodiment of the disclosed inventions. The network architecture includes one or more systems 210, 220, 230, and 240. The structure and functionality of systems 210, 220, 230, and 240 are similar to the structure and functionality of systems 110, 120, 130, and 140 respectively discussed above with reference to FIG. 1. Host systems 210, 220, and 230 are connected to hardware devices 212, 222, and 232 respectively which authenticate and process data. The structure and functionality of hardware devices 212, 222, and 232 are similar to the structure and functionality of hardware device 122 discussed above with reference to FIG. 1.

In an embodiment, each of the hardware devices 212, 222, and 232 encrypt outgoing data packets received from their respective host systems 210, 220, and 230. The hardware devices 212, 222, and 232 decrypt incoming data packets prior to sending them to the I/O ports of their respective host systems 210, 220, and 230. The encryption and decryption occurs at the data link layer, and therefore, the software applications or the operating system of the host systems 210, 220, and 230 do not have access to the encryption or decryption key(s). In certain embodiments, the operating system (OS) is unaware that encryption/decryption is even being performed. Consequently, a hacker or a malicious program cannot access information within the encrypted data packets. An additional advantage of the disclosed embodiments is that no host software would need to be rewritten because the hardware devices 212, 222, and 232 would perform all the encryption/encapsulation/delivery at a layer below the host OS (i.e., the data link layer). This means that no specific device drivers would be required for the hardware devices 212, 222, and 232.

In certain embodiments, symmetric key encryption and decryption is utilized. Specifically, the same global key is utilized to encrypt and decrypt data packets by the hardware devices 212, 222, and 232. This global key is stored in the respective memories of the hardware devices 212, 222, and 232. If the memories of the hardware devices 212, 222, and 232 are programmable, the stored global key may be modified by the system 240.

In other embodiments, asymmetric key encryption and decryption is utilized. Specifically, a single public key is stored in the respective memories of the hardware devices 212, 222, and 232. Distinct private keys specific to each hardware device 212, 222, and 232 are also stored in the respective memories of the hardware devices 212, 222, and 232. If the memories of the hardware devices 212, 222, and 232 are programmable, the stored public/private keys may be modified by the system 240. In an embodiment, the hardware devices 212, 222, and 232 use a secure key exchange method such as the Diffie-Hellman key exchange method to establish a common key (derived from the public/private keys) with another hardware device so that data packets can be securely transmitted between the communicating hardware devices. With asymmetric keys, only the communicating pair of hardware devices can decrypt transmitted data packets between those hardware devices.

Although FIGS. 1 and 2 illustrate architectures with four systems, other embodiments may include any suitable number of systems performing one or more of the functions of the systems described in FIGS. 1 and 2.

Figure 3:
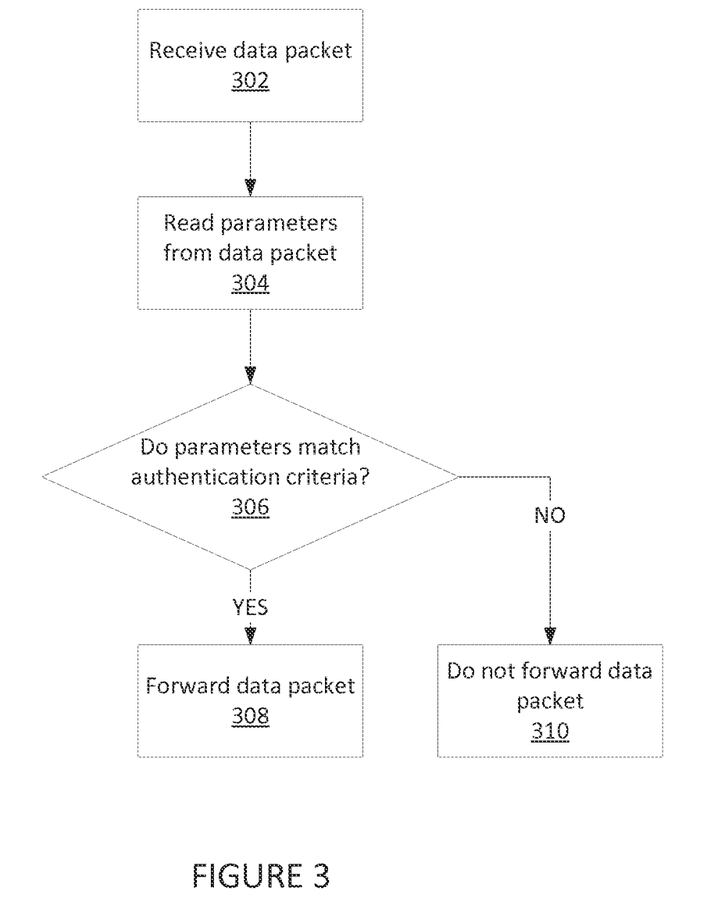
FIG. 3 illustrates a process to securely transmit data packets at the data link layer in accordance with one embodiment of the disclosed inventions.

FIG. 3 illustrates a process to securely transmit data packets at the data link layer in accordance with one embodiment of the disclosed inventions. Beginning at step 302, a hardware device, such as the hardware device described in FIG. 1, receives a data packet. At step 304, the hardware device reads the data packet and retrieves one or more parameters associated with the data packet. At step 306, if the parameters meet authentication criteria, the data packet is forwarded (step 308). If not, the data packet is not forwarded at step 310.

The parameters read by the hardware device at step 304 depend on the authentication criteria which specify the existence of one or more parameters and particular acceptable values for those parameters. The one or more parameters may include source address, destination address, header checksum, protocol, time to live (TTL), fragmentation information, length, quality of service, Internet header length, version, or any other suitable parameter found in the data packet.

At step 308, the destination to where the data packet is forwarded depends on the source of the data packet. If the source is the host system associated with the hardware device, the data packet is an outbound data packet. Therefore, the data packet will be forwarded to the network. Conversely, if the data packet is received by the hardware device from the network and is addressed to the host system associated with the hardware device, the data packet is an inbound packet. Therefore, the data packet will be forwarded to the host's I/O port.

Figure 4:
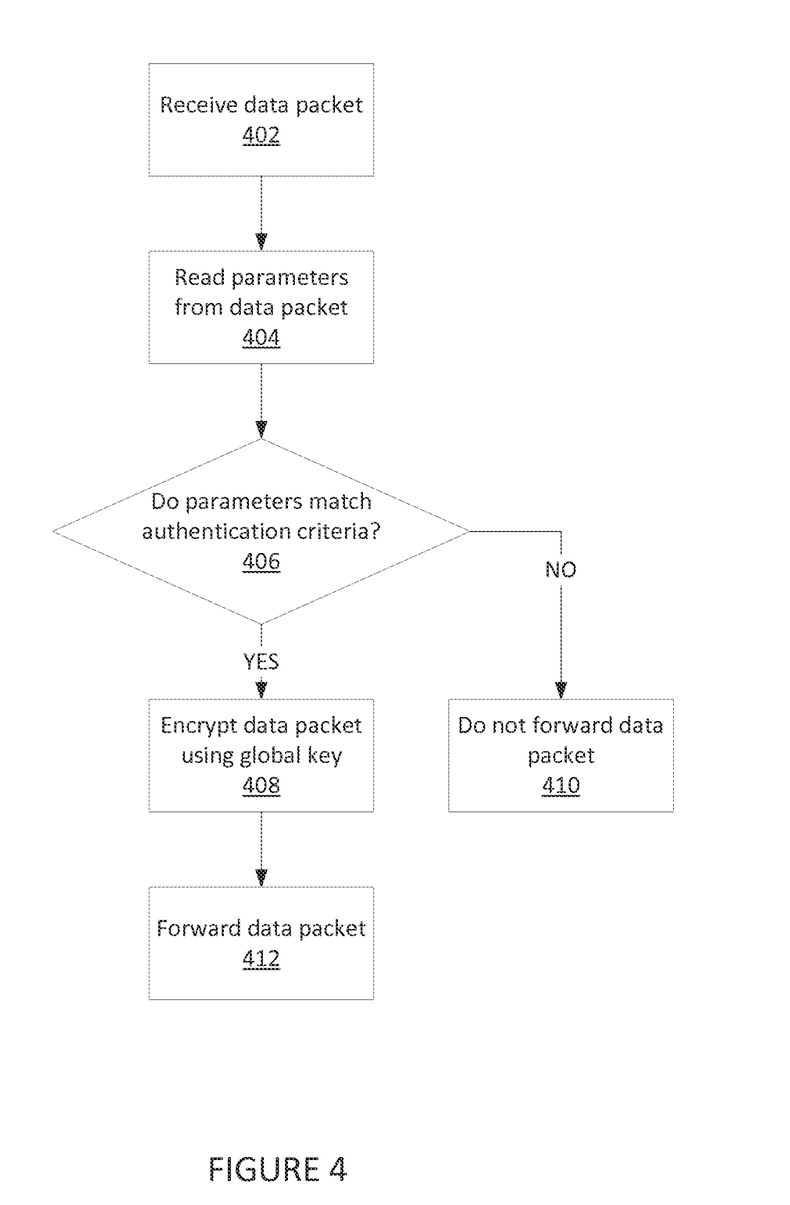
FIG. 4 illustrates a process to send data packets using symmetric encryption at the data link layer in accordance with one embodiment of the disclosed inventions.

FIG. 4 illustrates a process to send data packets using symmetric encryption performed at the data link layer according to an embodiment. At step 402, a hardware device receives a data packet from the hardware device's associated host system. At step 404, the hardware device reads the data packet and retrieves one or more parameters associated with the data packet. At step 406, if the parameters meet authentication criteria, the data packet is encrypted using a global key (step 408) and forwarded (step 412). If not, the packet is not forwarded at step 410. In an embodiment, after encrypting the data packet, the hardware device encapsulates the encrypted data packet with one or more of the parameters so that network devices that don't have access to the global key can still route the packet to the correct destination.

Figure 5:
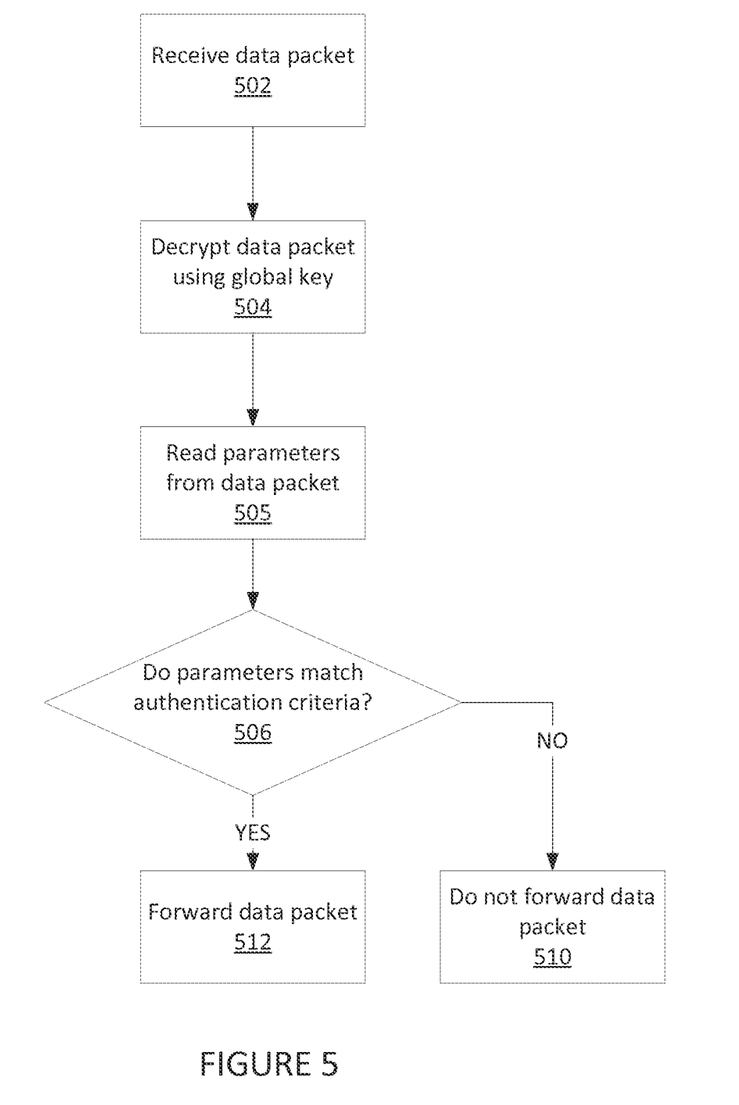
FIG. 5 illustrates a process to receive data packets using symmetric decryption at the data link layer in accordance with one embodiment of the disclosed inventions.

FIG. 5 illustrates a process to receive data packets using symmetric decryption performed at the data link layer according to an embodiment. At step 502, a hardware device receives a data packet from the network. At step 504, the hardware device decrypts the packet using a global key. At step 505, the hardware device reads the data packet and retrieves one or more parameters associated with the data packet. At step 506, if the parameters meet authentication criteria, the data packet is forwarded (step 512) to the host associated with the hardware device. If not, the packet is not forwarded at step 510.

Figure 6:
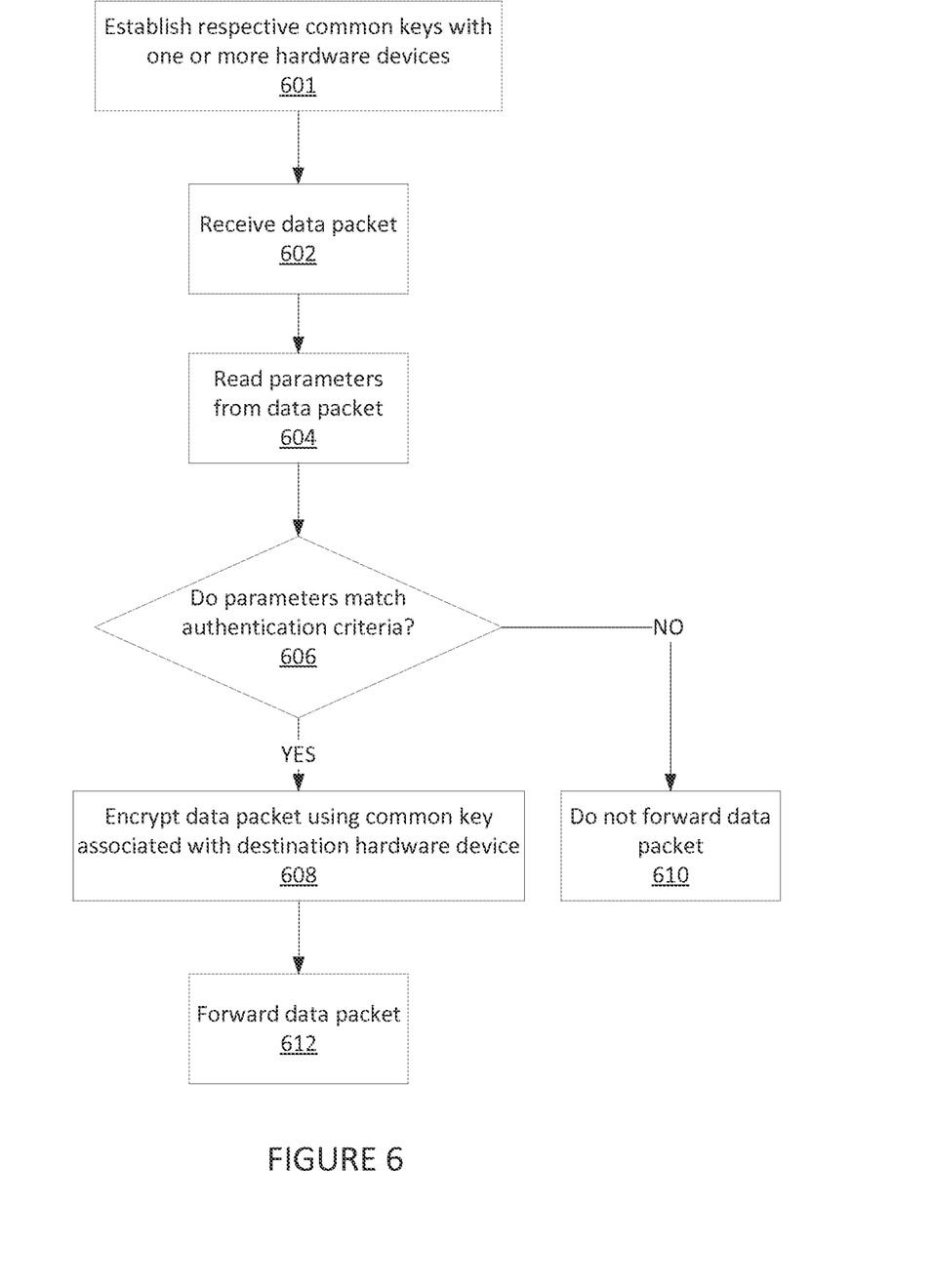
FIG. 6 illustrates a process to send data packets using asymmetric encryption at the data link layer in accordance with one embodiment of the disclosed inventions.

FIG. 6 illustrates a process to send data packets using asymmetric encryption performed at the data link layer according to an embodiment. At step 601, a hardware device establishes respective common keys with one or more hardware devices. Each common key is specific to the hardware device and exactly one other hardware device. The common key established between two hardware devices is derived from a public key, a private key of the first hardware device, and a private key of the second hardware device. In an embodiment, the Diffie-Hellman method is utilized to derive and exchange common keys. At step 602, the hardware device receives a data packet from the hardware device's associated host system. At step 604, the hardware device reads the data packet and retrieves one or more parameters associated with the data packet. At step 606, if the parameters meet authentication criteria, the data packet is encrypted using a common key established with the destination hardware device (step 608) and the encrypted data packet forwarded to the network (step 612). If not, the packet is not forwarded at step 610. In an embodiment, after encrypting the data packet, the hardware device encapsulates the encrypted data packet with one or more of the parameters so that network devices which don't have access to the common key can still route the packet to the correct destination.

Figure 7:
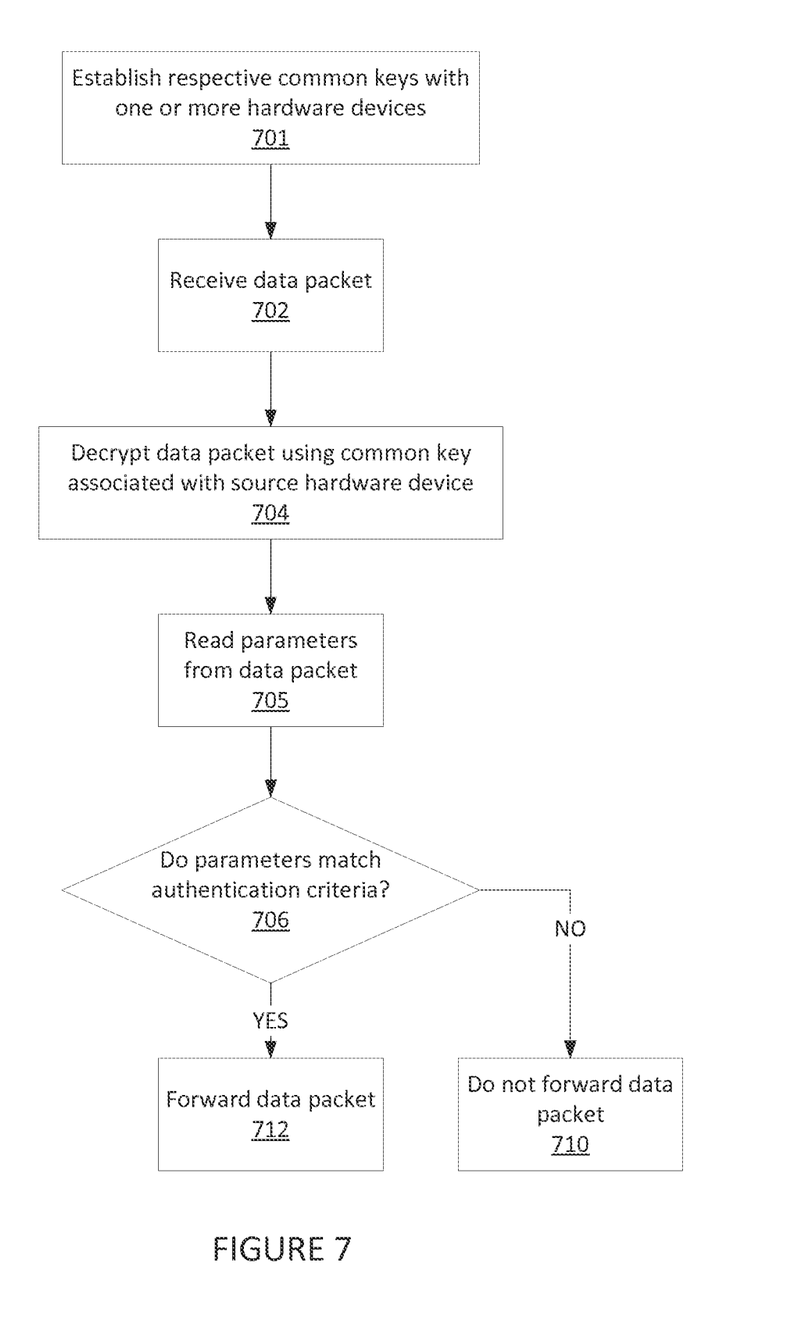
FIG. 7 illustrates a process to receive data packets using asymmetric decryption at the data link layer in accordance with one embodiment of the disclosed inventions.

FIG. 7 illustrates a process to receive data packets using asymmetric decryption at the data link layer according to an embodiment. At step 701, a hardware device establishes respective common keys with one or more hardware devices as explained above in the description pertaining to FIG. 6. At step 702, the hardware device receives a data packet from the network. At step 704, the hardware device decrypts the packet using the common key associated with the source hardware device (i.e., the hardware device which sent the data packet). At step 705, the hardware device reads the data packet and retrieves one or more parameters associated with the data packet. At step 706, if the parameters meet authentication criteria, the data packet is forwarded (step 712) to the host associated with the hardware device. If not, the packet is not forwarded at step 710.

Although the processes illustrated in FIGS. 4-7 include encryption/decryption and authentication, in other embodiments, the encryption/decryption steps can be performed without authentication.

Accordingly, the disclosed embodiments provide systems and methods for securing the communications of a host system at the data link layer using a specially configured hardware device. Some of the advantages of the disclosed embodiments include:

1) Providing very good security since only cards using the same scheme could communicate on the network;

2) If cards with the proper network device(s) plugged into the network they would need the proper global key to communicate even with the network equipment (switches, routers, firewalls) on the network. This would allow a company to have complete control of the systems on the network (no rogue smart phones, wireless, foreign laptops, etc.) would work with the global key and other systems' public keys if that feature is turned on;

3) A company would have complete control of which hosts are allowed to communicate to which hosts due to the network device filter and encryption. This could ensure, for instance, only the financial department connects to the financial servers, the financial servers to the financial databases, etc.;

4) Fully encrypted network since all systems on the network including switches, routers, etc. would need the proper NIC programmed with a network device and global and/or common keys. This would require all NICs to be from the same manufacture or some licensed version of it including the network equipment (switches, routers, firewalls, etc.) which could bring in additional new revenue;

5) No host software would need to be rewritten including network equipment because the network device would perform all the encryption/encapsulation/delivery at a layer below the host operating system (OS) meaning specific device drivers wouldn't be required for the network device;

6) Safety from hacked OS or applications since they don't have access to the network device; and 7) The network device can perform many functions at the data link layer. For example, the network device can perform quality of service (QoS) for streaming VOIP, or content filtering, access control, IDS/IPS, sniffing, etc.

It should be apparent from the foregoing that an invention having significant advantages has been provided. While the foregoing has described and depicted what is considered to be the best mode and/or other examples, it is understood that various modifications may be made therein and that the subject matter disclosed herein may be implemented in various forms and examples, and that the teachings may be applied in numerous applications, only some of which have been described herein. Those skilled in the art will recognize that the present disclosure is amenable to a variety of modifications and/or enhancements. Such modifications are intended to be covered within the true scope of the present teachings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

I claim:

1. A method for receiving data packets at a host system, the method comprising:

intercepting a data packet, at a data link layer, that is being sent to an input/output (I/O) port of the host system using a hardware device that is located between a hardware network interface and the input/output port of the host system, wherein the hardware device is internally coupled to the host system;

reading, using the hardware device, at least one parameter from the data packet;

determining, by the hardware device using instructions written in memory of the hardware device, whether the at least one parameter meets an authentication criteria, wherein the authentication criteria includes verifying that the data packet is received from a second host system having a second hardware device that is manufactured by a same manufacture as the hardware device and uses a same scheme as the hardware device, and wherein the host system is unable to write to the memory of the hardware device, and the hardware device executes the instructions written in the memory of the hardware device at an abstraction layer below the host system to prevent access by the host system to the authentication criteria;

in response to determining that the at least one parameter does not meet an authentication criteria, not forwarding, by the hardware device, the data packet to the input/output port of the host system; and in response to determining that the at least one parameter meets an authentication criteria, forwarding, by the hardware device, the data packet to the input/output port of the host system.

2. The method of claim 1, further comprising:
prior to reading the at least one parameter, decrypting the data packet using a global key.

3. The method of claim 1, further comprising:
prior to reading the at least one parameter, decrypting the data packet using a common key derived from a public key and a private key.

4. The method of claim 1, wherein the host system is unaware of the determining the at least one parameter meets the authentication criteria.

5. The method of claim 1, wherein the authentication criteria includes a source address.

6. The method of claim 1, wherein the memory of the hardware device is read-only memory.

7. The method of claim 1, wherein the instructions written in the memory of the hardware device is written by an external device.

8. A method for sending data packets from a host system, the method comprising:
intercepting a data packet, at a data link layer, that is being sent from an input/output (I/O) port of the host system using a hardware device located between a hardware network interface and the input/output port of the host system, wherein the hardware device is internally coupled to the host system;

reading, using the hardware device, at least one parameter from the data packet;

determining, by the hardware device using instructions written in memory of the hardware device, whether the at least one parameter meets an authentication criteria, wherein the host system is unable to write to the memory of the hardware device, and the hardware device executes the instructions written in the memory of the hardware device at an abstraction layer below the host system to prevent access by the host system to the authentication criteria; and in response to determining that the at least one parameter meets an authentication criteria, encrypting the data packet using a common key previously established with a destination hardware device, the destination hardware device being manufactured by a same manufacture as the hardware device and using a same scheme as the hardware device, and forwarding the data packet to a network.

9. The method of claim 8, further comprising:
encrypting the encapsulated data packet.

10. The method of claim 8, wherein the memory of the hardware device is configured to only be written to by an external device.

11. An apparatus comprising:
a communication interface for communicating with a host system;

memory configured to store instructions, wherein the memory is configured such that the host system cannot make any modifications to the instructions in the memory of the apparatus, and the apparatus executes the instructions stored in the memory of the apparatus at an abstraction layer below the host system to prevent access by the host system to an authentication criteria;

a processor configured to execute the instructions stored in the memory to:
intercept a data packet at the data link layer that is being sent to an input/output (I/O) port of the host system;
read at least one parameter from the data packet;
determine, using data and instructions written in the memory, whether the at least one parameter meets the authentication criteria, wherein the authentication criteria includes verifying that the data packet is receive from a second host system having a second hardware device that is manufactured by a same manufacture as the hardware device and uses a same scheme as the hardware device, and wherein the host system is unable to write to the memory of the apparatus;

in response to determining that the at least one parameter does not meet an authentication criteria, not forwarding, by the hardware device, the data packet to the input/output port of the host system; and in response to a determination that the at least one parameter meets an authentication criteria, forwarding the data packet to the input/output port of the host system.

12. The apparatus of claim 11, wherein the apparatus is a network interface controller.

13. The apparatus of claim 11, wherein the apparatus is a network switch.

14. The apparatus of claim 11, wherein the processor is further configured to:
prior to reading the at least one parameter, decrypt the data packet using a global key.

15. The apparatus of claim 11, wherein the processor is further configured to:
prior to reading the at least one parameter, decrypt the data packet using a common key derived from a public key and a private key.

16. The apparatus of claim 11, wherein the memory is read-only memory.

17. The apparatus of claim 11, wherein the authentication criteria includes a source address.

18. The apparatus of claim 11, wherein the host system has no knowledge of the instructions being executed by the apparatus.

19. The apparatus of claim 11, wherein the instructions written in the memory of the apparatus are configured to only be written to the memory by an external device.

* * * * *